(12) United States Patent
Klassen et al.

(10) Patent No.: US 7,222,410 B1
(45) Date of Patent: May 29, 2007

(54) METHOD OF ASSEMBLY OF A DISK DRIVE INCLUDING ENGAGING FIRST AND SECOND VCM PLATES WHILE MAINTAINING A HOLDING FORCE AGAINST THE FIRST VCM PLATE

(75) Inventors: Andrew S. Klassen, San Jose, CA (US); Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 219 days.

(21) Appl. No.: 10/976,465

(22) Filed: Oct. 27, 2004

(51) Int. Cl.
*H04R 31/00* (2006.01)

(52) U.S. Cl. .................. 29/603.03; 29/606; 29/607; 29/603.01; 29/603.23; 360/97.02

(58) Field of Classification Search ............. 29/603.03, 29/603.01, 603.23, 606, 607; 360/265, 265.8, 360/265.7, 97.02, 97.03, 264.7, 264.8, 264.9; 310/12, 15
See application file for complete search history.

(56) References Cited

U.S. PATENT DOCUMENTS

| | | | | |
|---|---|---|---|---|
| 5,905,609 A | * | 5/1999 | Butler et al. ............. | 360/264.8 |
| 5,907,453 A | * | 5/1999 | Wood et al. ............. | 360/97.02 |
| 5,909,338 A | * | 6/1999 | Butler et al. ............. | 360/97.01 |
| 6,549,380 B2 | * | 4/2003 | Kazmierczak ........... | 360/264.8 |
| 6,611,403 B1 | * | 8/2003 | Koester et al. .......... | 360/264.7 |

* cited by examiner

*Primary Examiner*—A. Dexter Tugbang
*Assistant Examiner*—Tai Van Nguyen
(74) *Attorney, Agent, or Firm*—Jason T. Evans, Esq.; Stetina, Brunda, Garred & Brucker (57) ABSTRACT

A method of assembly of a disk drive including providing a disk drive base. The method further includes providing a first VCM plate with an attached first magnet. The method further includes applying a holding force against the first VCM plate for holding the first VCM plate against the disk drive base. The method further includes providing a second VCM plate with an attached second magnet. The first and second VCM plates being cooperatively formed to engage each other with the first and second magnets facing towards each other with a magnetic attractive force. The method further includes engaging the second VCM plate with the first VCM plate while maintaining the holding force against the first VCM plate greater than the magnetic attractive force between the first and second magnets.

14 Claims, 6 Drawing Sheets

METHOD OF ASSEMBLY OF A DISK DRIVE INCLUDING ENGAGING FIRST AND SECOND VCM PLATES WHILE MAINTAINING A HOLDING FORCE AGAINST THE FIRST VCM PLATE

BACKGROUND OF THE INVENTION

1. Field of the Invention

The present invention relates generally to disk drives, and in particular to a method of assembly of a disk drive including applying a holding force against a first VCM plate during engagement with a second VCM plate.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base.

The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to data tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body, and a coil is supported by the coil support. The coil is configured to interact with one or more permanent magnets to form a voice coil motor (VCM). Typically a pair of magnets is utilized, with a magnet being disposed on each side of the coil. The magnets each include a VCM plate, which is used to securely position the magnets. Energizing the coil results in forces that tend to pivot the actuator. A change in the direction of current through the coil results a change in the resulting pivot direction.

One or more actuator arms extend from an opposite side of the actuator body. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both surfaces along data annular regions. As such, the head stack assembly may be pivoted such that each transducer head is disposed adjacent the various data annular regions from adjacent an outer diameter (OD) to an inner diameter (ID) of each disk.

A topic of concern is the assembly/disassembly process in regards to the pair of magnets and the VCM plates and the actuator. One prior art assembly method includes attaching a first one of the magnets and its associated VCM plate to the disk drive base. This may be accomplished with one or more fasteners such as screws. Subsequently, the actuator may be positioned over the attached magnet and VCM plate. The second magnet and VCM plate may be then positioned over the actuator and the coil. An attractive force between the two magnets facilitates attachment of the second magnet and its VCM plate. The use of fasteners to attach the first magnet and VCM plate presents several problems. It is contemplated that the magnets and their VCM plates and the actuator may have to be disassembled during the life of the disk drive (such as for testing, maintenance or repair). Removal of the fasteners may result in the undesirable release of metal particles resulting in contamination within the disk drive. Further, the use of the fasteners require the additional step of their removal during the disassembly of the disk drive. An additional problem is that upon the installation of the second magnet and VCM plate, just before the moment of contact of the two VCM plates the attractive force of the two magnets result in a sudden engagement of the VCM plates. This may result in an undesirable release of debris due to damage of the impacting surfaces.

Another method of assembly of the disk drive, includes attaching the first magnet and its VCM plate to the disk drive base through adhesive bonding. This attachment, however, precludes the ready removal of the VCM plate during disassembly of the disk drive. Further, use of adhesives present contamination problems within the disk drive. As mentioned above, an additional problem arises due to the attractive force of the two magnets that results in a sudden engagement of the two VCM plates, which may result in an undesirable release of debris.

Yet another method of the assembly of the disk drive is to first assemble the two magnets and their VCM plates about the actuator. The magnets, the VCM plates and the actuator are then collectively installed into the disk drive base. Such a method, however, presents significant difficulties in the handling of such components during their collective installation because the magnets/VCM plates are not directly attached to the actuator.

As such, there is a need in the art for an improved method of assembly of the magnets and their VCM plates into a disk drive in comparison to the prior art.

SUMMARY OF THE INVENTION

According to an aspect of the present invention, there is a method of assembly of a disk drive including providing a disk drive base. The method further includes providing a first VCM plate with an attached first magnet. The method further includes applying a holding force against the first VCM plate for holding the first VCM plate against the disk drive base. The method further includes providing a second VCM plate with an attached second magnet. The first and second VCM plates being cooperatively formed to engage each other with the first and second magnets facing towards each other with a magnetic attractive force. The method further includes engaging the second VCM plate with the first VCM plate while maintaining the holding force against the first VCM plate greater than the magnetic attractive force between the first and second magnets.

In an embodiment, the first VCM plate is not attached to the disk drive base. The holding force may be applied at three contact points about the first VCM plate. The method may further include providing an actuator including an actuator body and a coil support extending from the actuator body, and a coil attached to the coil support. The method further includes attaching the actuator to the disk drive base with the first VCM plate disposed between the coil support and the disk drive base. The method may further include engaging the second VCM plate with the first VMC plate with the coil support disposed between the first and second VCM plates. The method may further include using a holding mechanism including at least one holding pin configured to contact the first VCM plate and apply the holding force against the first VCM plate. The first and second VCM plates may be cooperatively configured to allow the at least one holding pin to extend perpendicular to the first and second VCM plates and along the second VCM plate while contacting the first VCM plate. The method may include using a holding mechanism including three holding pins configured to contact the first VCM plate and applying the holding force against the first VCM plate. The at least one holding pin may be formed of a non-magnetic metal material. The non-magnetic metallic material may be a Cobalt alloy or a Nickel alloy for example. The at least one holding pin may be electrically grounded. A retaining mechanism may be used which is configured to retain the second VCM plate while moving the second VCM plate towards the first VCM plate. A spring may be provided for providing a spring force between the holding mechanism and the retaining mechanism, the spring is configured to provide an increasing spring force as the second VCM plate is positioned closer to the first VCM plate.

DESCRIPTION OF THE PREFERRED EMBODIMENTS

Referring now to the drawings wherein the showings are for purposes of illustrating preferred embodiments of the present invention only, and not for purposes of limiting the same, FIGS. 1-15 illustrate a method of assembly of a disk drive in accordance with aspects of the present invention.

Figure 1:
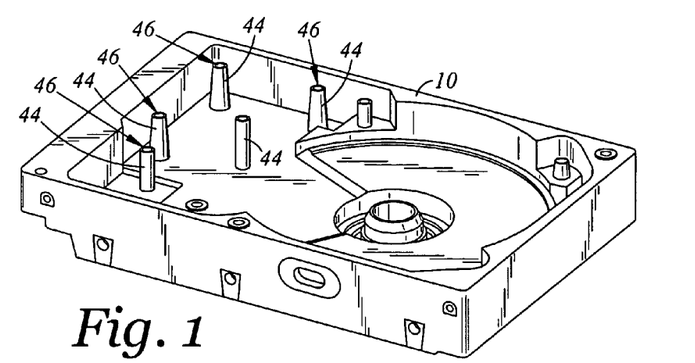
FIG. 1 is a perspective view of a disk drive base.
Figure 9:
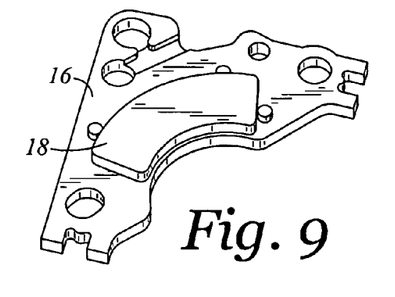
FIG. 9 is a perspective view of the first magnet and the first VCM plate.
Figure 10:
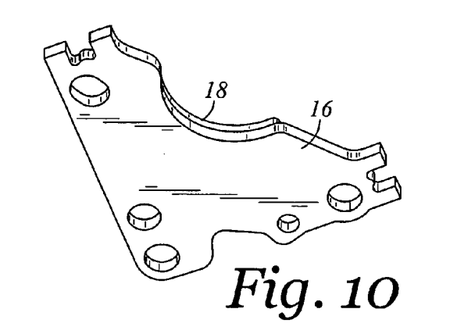
FIG. 10 is a perspective view of the first magnet and the first VCM plate of FIG. 9 as shown from another angle.
Figure 11:
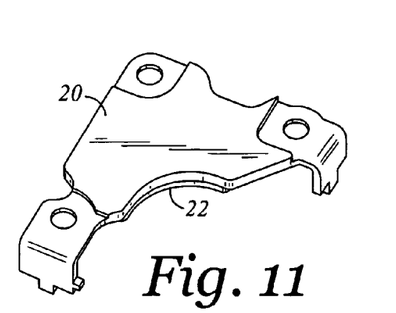
FIG. 11 is a perspective view of the second magnet and the second VCM plate.
Figure 12:
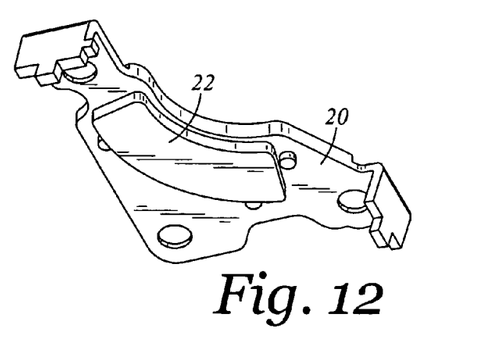
FIG. 12 is a perspective view of the second magnet and the second VCM plate of FIG. 11 as shown from another angle.
Figure 15:
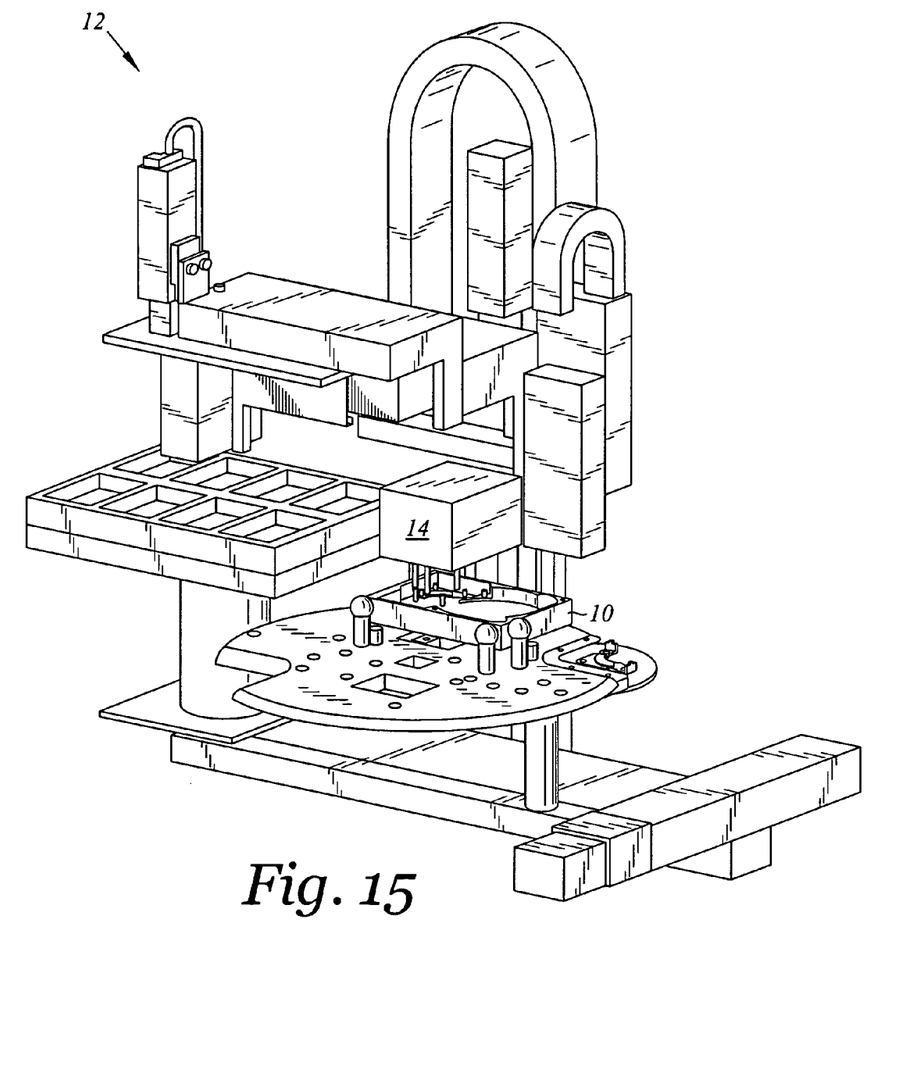
FIG. 15 is a perspective view of an assembly station used for the assembly of the disk drive in accordance with aspects of the present invention.

Referring now to FIG. 1 there is provided a perspective view of a disk drive base 10. FIG. 15 depicts a perspective view of an assembly station 12 used for the assembly of a disk drive in accordance with aspects of the present invention. The assembly station 12 is configured to have access to various disk drive components. As is seen, the disk drive base 10 is initially nested within the assembly station 12. The assembly station 12 includes a robotic armature 14 which may be used for the assembly of the disk drive. An aspect of the present invention pertains to the assembly of the disk drive. In particular, the method pertains to the assembly of a first VCM plate 16 with an attached first magnet 18 with a second VCM plate 20 with an attached second magnet 22 as shown in FIGS. 9-12. FIG. 9 is a perspective view of the first VCM plate 16 and its attached first magnet 18, and FIG. 10 is a perspective view of the first VCM plate 16 and the first magnet 18 of FIG. 9 as shown from another angle. FIG. 11 is a perspective view of the second VCM plate 20 and its attached second magnet 22, and FIG. 12 is a perspective view of the second VCM plate 20 and the second magnet 22 of FIG. 11 as shown from another angle.

As will be discussed in detail below, according to an aspect of the present invention, there is a method of assembly of a disk drive including providing a disk drive base 10. The method further includes providing the first VCM plate 16 with the attached first magnet 18. The method further includes applying a holding force against the first VCM plate 16 for holding the first VCM plate 16 against the disk drive base 10. The method further includes providing the second VCM plate 20 with the attached second magnet 22. The first and second VCM plates 16, 20 are cooperatively formed to engage each other with the first and second magnets 18, 22 facing towards each other with a magnetic attractive force. The method further includes engaging the second VCM plate 20 with the first VCM plate 16 while maintaining the holding force against the first VCM plate 16 greater than the magnetic attractive force between the first and second magnets 18,22.

Figure 2:
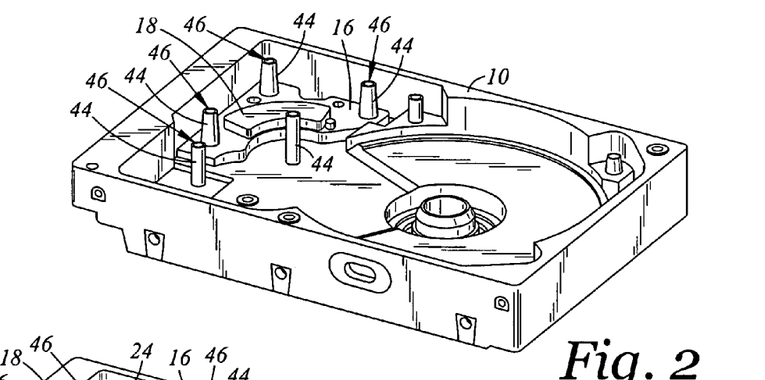
FIG. 2 is the perspective view of the disk drive base of FIG. 1 as shown with a first magnet and a first VCM plate installed.

Referring now to FIG. 2 there is depicted the perspective view of the disk drive base 10 of FIG. 1 as shown with the first VCM plate 16 and the first magnet 18 installed in the disk drive base 10. In this regard, the robotic armature 14 may be utilized for placement of the first VCM plate 16 in the disk drive base 10.

Figure 3:
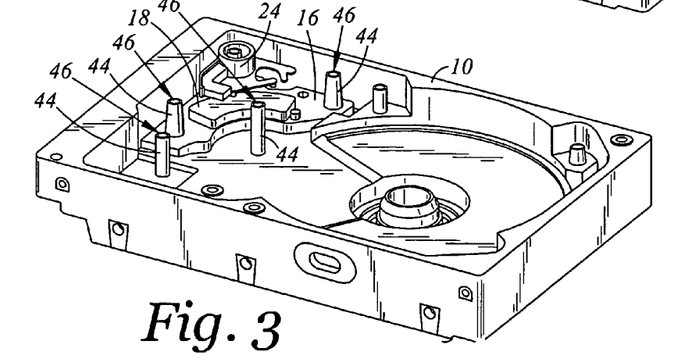
FIG. 3 is the perspective view of the disk drive base, the first magnet and the first VCM plate of FIG. 2 as shown with a latch/crash stop installed.

Referring now to FIG. 3, there is depicted the perspective view of the disk drive base 10, the first VCM plate 16, and the first magnet 18 of FIG. 2 as shown with a latch/crash stop 24 installed in the disk drive base 10. In this regard, the robotic armature 14 may be utilized for placement of the latch/crash stop 24 in the disk drive base 10.

Figure 4:
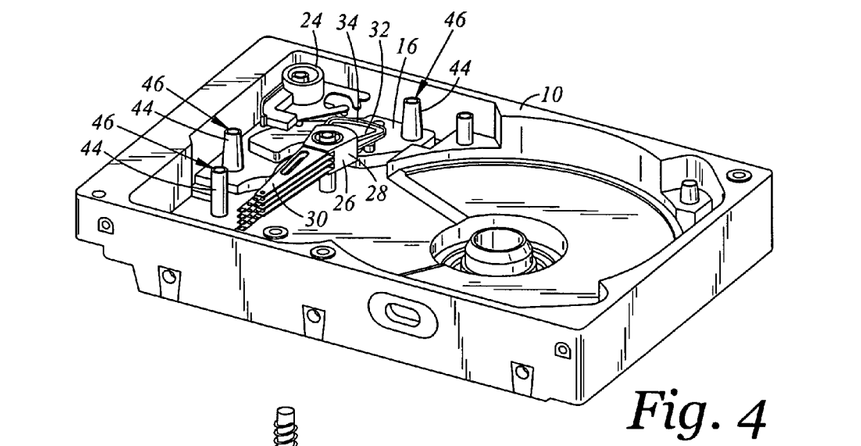
FIG. 4 is the perspective view of the disk drive components of FIG. 3 as shown with an actuator installed.

Referring now to FIG. 4, there is depicted the perspective view of the disk drive components of FIG. 3 as shown with an actuator 26 installed in the disk drive base 10. In this regard, the robotic armature 14 may be utilized for placement of the actuator 26 in the disk drive base 10. The actuator 26 includes an actuator body 28. A plurality of actuator arms (the topmost one denoted 30) extend from the actuator body 28. Extending in an opposing direction is a coil support 32. The coil support 32 supports a coil 34. The actuator 26 is configured to pivot adjacent the first magnet 18 with the coil 34 over the first magnet 18. The coil 34 is contemplated to interact with the first magnet 18 to form a voice coil motor. The actuator 26 is contemplated to interact with the latch/crash stop 24 upon parking of the actuator 26.

Figure 5:
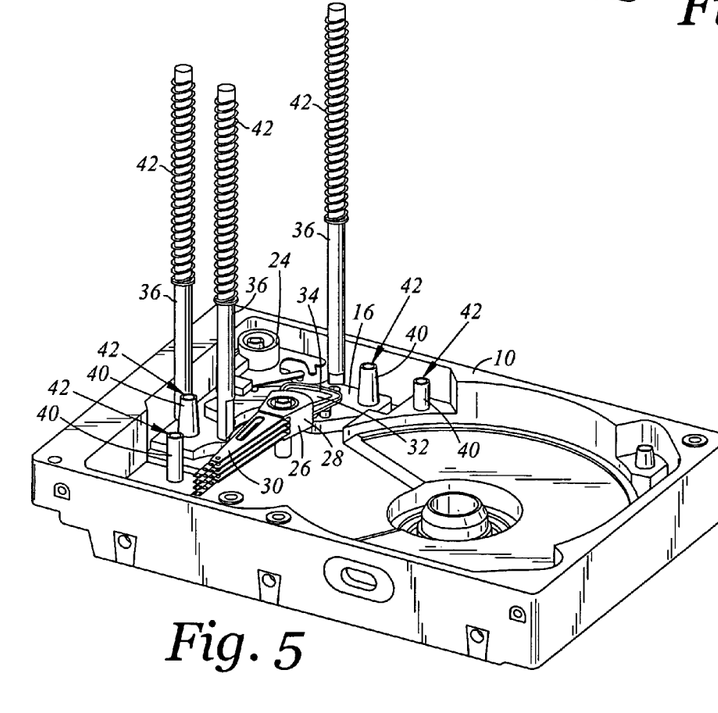
FIG. 5 is the perspective view of the disk drive components of FIG. 4 as shown with holding pins applying a holding force against the first VCM plate.
Figure 13:
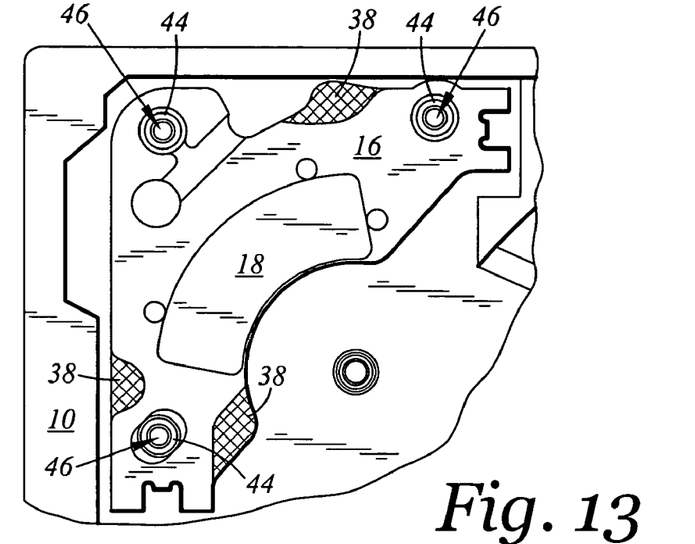
FIG. 13 is an enlarged top plan view of a portion of the disk drive base and the first magnet and the first VCM plate of FIG. 2 (with holding pin land regions indicated in cross hatching)

As mentioned above, the method further includes applying a holding force against the first VCM plate 16 for holding the first VCM plate 16 against the disk drive base 10. As such, the method may include using a holding mechanism that may take the form of three holding pins 36 as is shown in FIG. 5. The holding pins 36 are configured to contact the first VCM plate 16 and to apply the holding force against the first VCM plate 16. While three holding pins 36 are shown as being utilized, it is contemplated that at least one holding pin 36 may be used. FIG. 13 is an enlarged top plan view of a portion of the disk drive base 10, the first VCM plate 16, and the first magnet 18. The first VCM plate 16 includes three holding pin land regions 38 indicated in cross hatching. In this regard, the three holding pins 36 are contemplated to respectively contact the first VCM plate at the three holding pin land regions 38.

The holding pins 36 may be formed of a non-magnetic metal material. This is because when the holding pins 36 are removed, it is desirable that the holding pins 36 do not magnetically pull and therefore move the first VCM plate 18. The holding pins 36 are preferably electrically grounded to guard against undesirable electrical discharge events. As such the material is preferably electrically conductive. Further, the holding pins 36 are preferably formed of a relatively hard material so as to be dimensionally stable after repeated impacts with the first VCM plate 18, which may be formed of magnetic steel. In this regard, Aluminum or plastic would not be appropriate as such materials may be relatively too soft. Further still, the material should be relatively "clean" such that it does not shed particles upon repeated impacts. Suitable non-magnetic metallic materials used for the holding pins 32 may include a Cobalt alloy (such as Mitsubishi Colbalt Alloy No. 6B) or a Nickel alloy (such as Inconel 718) for examples. In addition some non-magnetic stainless steel materials may be utilized. Further, it is contemplated that conductive or static dissipative ceramic materials may be also used. It is also contemplated that a super hard, conduction or static dissipative polymer material, such as carbon fiber or graphite or other polymer material, may also be used.

A retaining mechanism may be used which is configured to retain the second VCM plate 20 while moving the second VCM plate 20 towards the first VCM plate 16. In this regard, referring now to FIG. 6 there is depicted a perspective view of the second magnet 22 and the second VCM plate 20 as shown with retaining pins 40. The retaining pins 40 may extend from the robotic armature 14. The robotic armature 14 may locate the second VCM plate 20 for installation in the disk drive base 10. As such, though not shown in detail the assembly station 12 includes a storage location for the second VCM plate 20.

Figure 6:
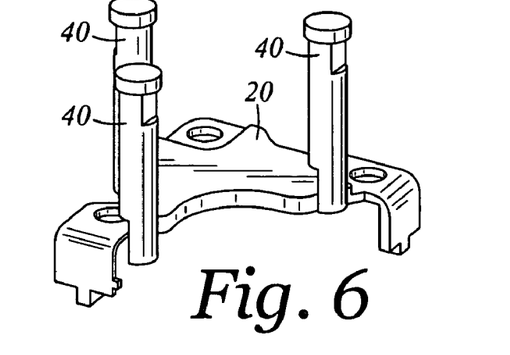
FIG. 6 is the perspective view of a second magnet and a second VCM plate as shown with retaining pins.

As is shown, the retaining pins 40 may be used to retain the second VCM plate 20. The retaining pins 40 may include fingered ends so as to engage the second VCM plate 20 when vertically lifted. Axial rotation of the retaining pins 40 may release engagement of the fingered ends with the second VCM plate 20.

Figure 7:
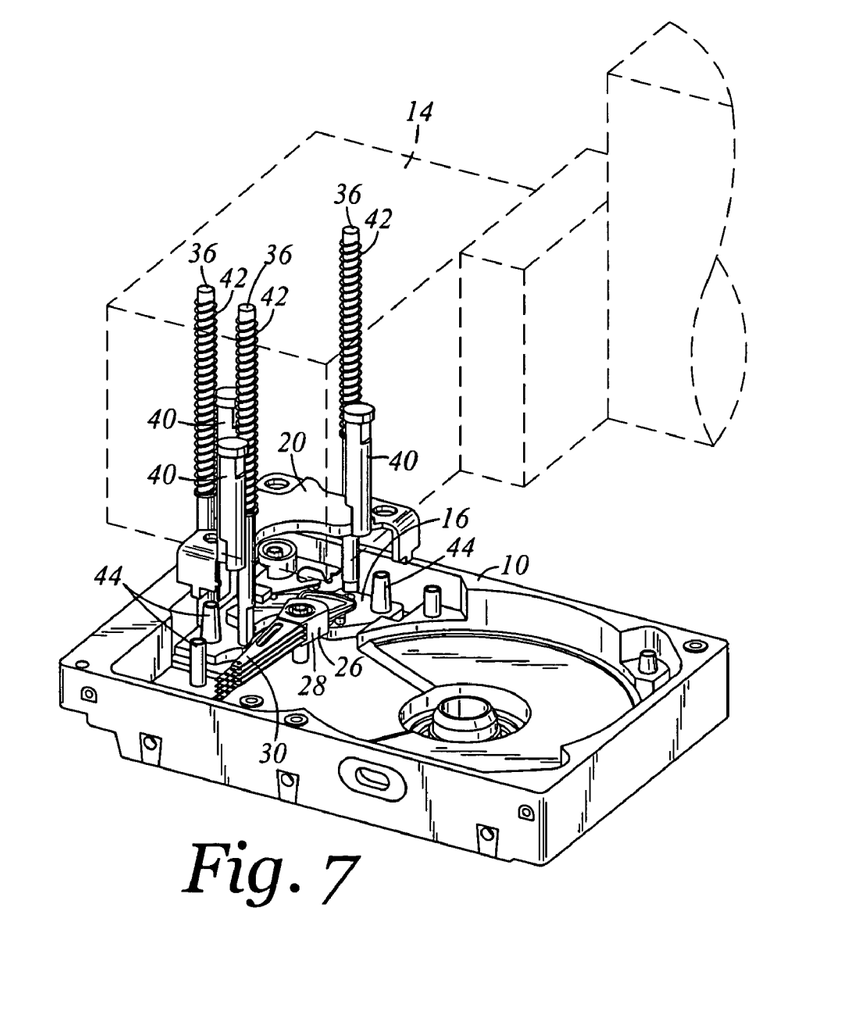
FIG. 7 is the perspective view of the disk drive components of FIG. 5 as shown, with the second magnet, the second VCM plate, and the retaining pins (with associated retaining mechanism armature shown in phantom) prior to the second magnet and the second VCM plate being installed.

Referring now to FIG. 7 there is depicted the perspective view of the disk drive components of FIG. 5 as shown with the robotic armature 14 shown in phantom. The retaining pins 40 are shown as positioning the second VCM plate 20 and the second magnet 22 over the first VCM plate 16 prior to being installed. The first and second magnets 18, 22 are disposed as facing each other. At this point, the holding pins 36 are shown as applying the holding force downwardly against the first VCM plate 16.

The first and second magnets 18, 22 are contemplated to create a magnetic attractive force with respect to each other. As mentioned above, the method includes engaging the second VCM plate 20 with the first VCM plate 16 while maintaining the holding force against the first VCM plate 16 greater than the magnetic attractive force between the first and second magnets 18, 22. As such, during engagement, the second VCM plate 20 may be controllably lowered onto the first VCM plate 16 without any sudden movement of the first VCM plate 20 due to the magnetic attractive force.

To facilitate such controlled lowering, springs 42 may be provided for providing a spring force between the holding mechanism and the retaining mechanism. Though not shown in detail, the springs 42 may be engaged with the holding pins 36 and the robotic armature 14 to facilitate such relative controlled lowering. As is depicted, each of the holding pins 36 includes a spring 42. Each spring 42 is configured to provide an increasing spring force as the second VCM plate 20 is positioned closer to the first VCM plate 16.

Figure 8:
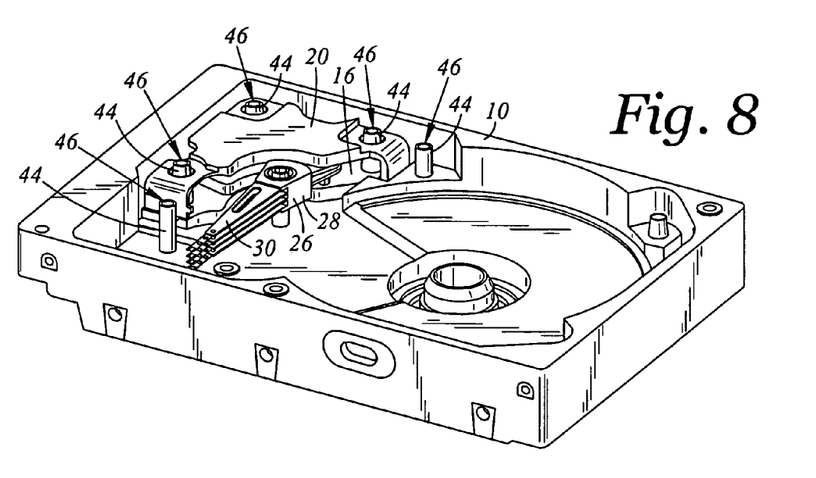
FIG. 8 is the perspective view of the disk drive components of FIG. 5 as shown with the second VCM plate and second magnet installed.
Figure 14:
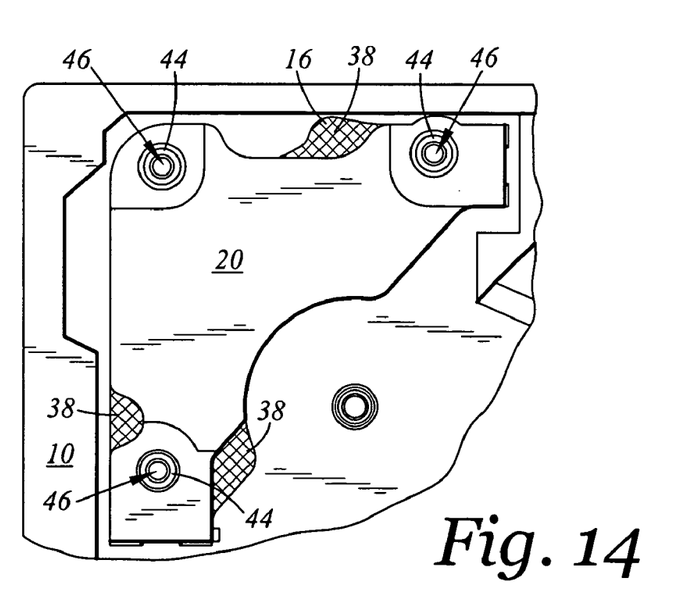
FIG. 14 is the enlarged top plan view of the portion of the disk drive base and the first magnet and the first VCM plate of FIG. 2 as shown with the second VCM plate in its installed location.

FIG. 8 is the perspective view of the disk drive components of FIG. 5 as shown with the second VCM plate 20 and the second magnet 22 installed. Referring now to FIG. 14 there is depicted the enlarged top plan view of the portion of the disk drive base 10 and the first VCM plate 16 are shown in FIG. 13, however, with the second VCM plate 20 in its installed location. It is noted that the latch/crash stop 24 and the actuator 26 are not depicted for ease of illustration. As can be seen the second VCM plate 20 is configured so as to expose the holding pin land regions 38 when viewed from this angle. As such, the second VCM plate 20 does not interfere with the vertical extension of the holding pins 36 perpendicular to the first and second VCM plates 16, 20.

The disk drive base 10 may include posts 44. The posts 44 are laterally located to accommodate the first and second VCM plates 16, 20. In this regard the posts 44 may be utilized to laterally secure the first and second VCM plates 16, 20. The posts 44 may include screw holes 46. Though not shown, it is contemplated that a cover may be attached to the disk drive base 10 with screws engaged within the screw holes 46. The posts 44 may extend vertically as shown and therefore facilitate screw lengths that are commonly utilized as being engaged directly into the disk drive base 10. The second VCM plate 20 may be additionally retained by the cover. In this regard, the method may further include attaching the cover to the disk drive base 10 with the second VCM plate 20 disposed against the cover.

We claim:

1. A method of assembly of a disk drive, the method comprising:
   a) providing a disk drive base;
   b) providing a first VCM plate with an attached first magnet;
   c) applying a holding force against the first VCM plate for holding the first VCM plate against the disk drive base;
   d) providing a second VCM plate with an attached second magnet, the first and second VCM plates being cooperatively formed to engage each other with the first and second magnets facing towards each other with a magnetic attractive force; and
   e) engaging the second VCM plate with the first VCM plate while maintaining the holding force against the first VCM plate greater than the magnetic attractive force between the first and second magnets.

2. The method of claim 1 wherein the first VCM plate is not attached to the disk drive base.

3. The method of claim 1 wherein step c) the holding force is applied at three contact points about the first VCM plate.

4. The method of claim 1 wherein step c) further includes:
   i) providing an actuator including an actuator body and a coil support extending from the actuator body, and a coil attached to the coil support; and
   ii) attaching the actuator to the disk drive base with the first VCM plate disposed between the coil support and the disk drive base.

5. The method of claim 4 wherein step e) further includes engaging the second VCM plate with the first VMC plate with the coil support disposed between the first and second VCM plates.

6. The method of claim 1 wherein step c) includes using a holding mechanism including at least one holding pin configured to contact the first VCM plate and applying the holding force against the first VCM plate.

7. The method of claim 6 wherein the first and second VCM plates are cooperatively configured to allow the at least one holding pin to extend perpendicular to the first and second VCM plates and along the second VCM plate while contacting the first VCM plate.

8. The method of claim 6 wherein step c) includes using a holding mechanism including three holding pins configured to contact the first VCM plate and apply the holding force against the first VCM plate.

9. The method of claim 6 wherein the at least one holding pin is formed of a non-magnetic metal material.

10. The method of claim 9 wherein the non-magnetic metallic material is a Cobalt alloy.

11. The method of claim 9 wherein the non-magnetic metallic material is a Nickel alloy.

12. The method of claim 6 wherein the at least one holding pin is electrically grounded.

13. The method of claim 6 wherein step e) includes using a retaining mechanism configured to retain the second VCM plate while moving the second VCM plate towards the first VCM plate.

14. The method of claim 13 wherein step e) includes providing a spring for providing a spring force between the holding mechanism and the retaining mechanism, the spring is configured to provide an increasing spring force as the second VCM plate is positioned closer to the first VCM plate.

* * * * *